Aug. 14, 1973     H. S. ST. CESAIRE     3,752,662
RECOVERY OF METAL FROM GLASS CLOTH FILTERS AND THE LIKE
Filed Jan. 8, 1971
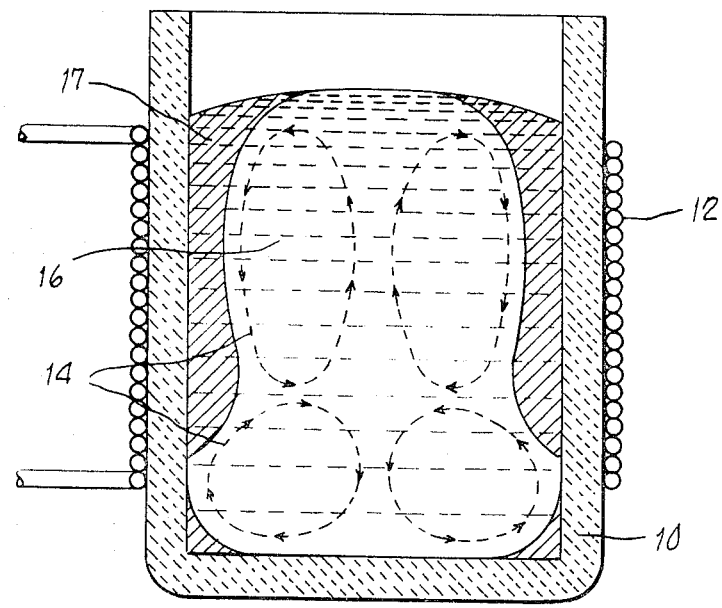
HAN SPOEL
INVENTOR
BY
Christopher C. Dunham
ATTORNEY

United States Patent Office 3,752,662
Patented Aug. 14, 1973

3,752,662
RECOVERY OF METAL FROM GLASS CLOTH FILTERS AND THE LIKE
Han Spoel, St. Cesaire, Quebec, Canada, assignor to Alcan Research and Development Limited, Montreal, Quebec, Canada
Filed Jan. 8, 1971, Ser. No. 104,962
Int. Cl. C22d 7/02
U.S. Cl. 75—10 R                           10 Claims

ABSTRACT OF THE DISCLOSURE

For recovery of aluminum metal from glass cloth that has been used to filter the metal and has become at least partially coated therewith, the coated glass cloth is introduced to a heel of molten aluminum in an induction furnace, together with an amount of salt flux at least equal in weight to the nonmetallic content (including the glass cloth) of the coated cloth while the heel is continuously heated and circulated by electrical induction. The metal coating the cloth melts and coalesces with the heel, while the glass cloth is broken up by the circulation of the metal heel and becomes mixed with the flux. When the operation is completed and current supply to the furnace is shut off, the flux and other nonmetallics including the partially disintegrated glass cloth separate from the metal of the heel as a discrete and readily removable layer. The metal from the cloth, having become mixed with and augmented the heel, is recovered by withdrawing from the furnace at least part of the molten heel.

BACKGROUND OF THE INVENTION

This invention relates to the recovery of metal from glass cloth at least partially coated therewith. In a particular sense, the invention is directed to recovery of aluminum from cloth that has been used to filter molten aluminum metal and has become coated with the metal incident to such filtration. As herein used, the term "aluminum" includes aluminum base alloys.

Glass cloth, i.e. fabric woven of glass fiber, is widely used as a filtering medium for molten aluminum. For example, in the casting of aluminum it is common practice to pass the molten aluminum through one or more glass cloth filter screens as the molten metal is delivered from a furnace to the mold wherein it is to be cast. Filtration of the metal through glass cloth serves to remove nonmetallic contaminants, including oxides which may form on a molten aluminum surface, and thus to minimize or prevent inclusion of these contaminants in the cast article.

Glass cloth filters as used for filtration of molten aluminum may be relatively large in area and may require relatively frequent replacement. Thus in the case of so-called direct chill casting of aluminum ingots, commonly involving simultaneous casting of a plurality of elongated ingots in an array of direct chill casting molds supplied with molten aluminum from a common source, the glass cloth filters used in the casting operation may be replaced after each "drop," i.e. after each batch of ingots is cast. The used glass cloth filters, as removed, are coated partially or largely with aluminum metal that has solidified on the cloth, together with impurities such as aluminum and other metal oxides, nitrides and carbides that may have been carried, in, and removed by the filter from, the molten metal. Usually, the metal content of the used filter is greater than 80% of the total weight of the used filter, including weight of glass cloth.

For reasons of economy, it is desirable to recover the free metal carried by used glass cloth filters, owing both to the high metallic content of the used filter and to the large number of filters that are used and removed in the course of commercial-scale casting operations. Procedures heretofore employed for the recovery of aluminum metal from used glass cloth filters have, however, involved substantial difficulty and inconvenience.

One method heretofore employed for recovering metal from glass cloth filters has involved simply introducing the aluminum-coated filter cloth to a conventional batching or melting furnace containing molten aluminum. The coated filters tend to float on the surface of the molten metal in the furnace, rather than becoming immersed in the melt. Substantial loss of metal occurs through oxidation, and in addition impurities such as boride particles from the filters may contaminate the molten aluminum in the furnace. Furthermore, it has been found that the dross from a conventional furnace to which glass colth filters have been added is difficult to process and has a lower-than-usual metal content. The presence of the integral glass cloths floating on the melt surface also makes it difficult to remove dross from the furnace by conventional procedures such as skimming.

Indeed, it has been found that when used, i.e. aluminum-coated, glass cloth filters are added to a melting furnace containing a body of molten aluminum, there may be a net loss of aluminum from the furnace rather than a gain in free metal as would be expected to result from the remelting of the metal coating on the filter cloth. It is presently believed that this net loss of metal from the furnace may be attributable to burning of the metal coating of the glass cloth, together with a wicklike action of the cloth in drawing molten metal up from the furnace to the surface where this upwardly drawn metal is also lost through burning or oxidation. Also, the glass cloth filters remain as integral bodies of cloth more or less floating on the melt surface in the furnace, and when they are removed (as they must be, incident to operation of the furnace), they tend to drag out metal with them.

Because of difficulties such as the foregoing, users of glass cloth filters in aluminum casting and like operations often sell the used glass cloth screens to secondary smelters for recovery of the metal. Further difficulties, however, are encountered in the baling and shipping of the used filters, since the presence of glass fiber particles renders the baling operation unpleasant, and the residues on the glass cloth tend to react rapidly with moisture, and as a result to generate hydrogen, e.g. during shipment. Furthermore, the procedures employed by secondary smelters have not afforded desirably high percentage recoveries of metal.

In an illustrative procedure, the aluminum-coated glass cloths are placed in a rotary furnace together with a salt flux that melts in that furnace. Owing to the relatively low apparent density of the glass cloth, the used filters tend to float on the surface of the rotary furnace charge, with the result that substantial quantities of the metal they carry are exposed to the air and last by burning.

SUMMARY OF THE INVENTION

An object of the present invention is to provide new and improved procedures for recovering metal from glass cloth at least partially coated therewith. A further object is to provide such procedures for achieving enhanced percentage recoveries of aluminum metal from aluminum-coated glass cloth filter screens and the like in an operationally convenient manner.

To these and other ends, the present invention contemplates the recovery of metal from metal-coated glass cloth by the steps of introducing the coated glass cloth to a molten heel of the metal in an induction furnace and supplying to the heel in the furnace a quantity of a salt flux that melts upon contact with the heel while continuously heating the heel in the furnace by electrical induction.

Stated with reference to the treatment of used glass cloth filters and like glass cloth articles partially or largely coated with aluminum, the method of the invention may be performed in a so-called coreless induction furnace in which there may be initially established a heel of molten aluminum, e.g. about one third or more of the furnace capacity. The amount of salt flux added to the heel should be at least equal in weight to the amount of nonmetallic material (including glass fiber) present in the coated glass cloth to be treated; preferably, the amount of flux used is substantially greater than the weight of nonmetallics in the used filters, a flux-to-nonmetallics ratio of 1.7 to 1 or higher having been found especially satisfactory. The flux may be added to the furnace in solid particulate form and melts in the furnace. The amount of flux present in molten state in the furnace should at all times be at least sufficient to satisfy the desired flux-to-nonmetallics ratio; i.e. as aluminum-coated glass cloth is added to the furnace, there should be already present in the furnace sufficient molten flux to provide the desired flux-to-nonmetallics ratio, taking into account the nonmetallic content of the newly added glass cloth.

Thus in accordance with presently preferred practice, there is added to the heel in the furnace a substantial proportion of the flux that is to be employed, and thereafter the coated glass cloths to be treated are introduced successively to the melt in the furnace, interspersed as necessary with further additions of flux. Throughout this succession of steps, the induction furnace is ordinarily continuously operated, by passage of alternating current through a coil surrounding a vessel containing the melt.

Passage of the current through the coil generates eddy currents in the melt, and it is the resistance of the melt to these eddy currents that produces heat therein, sufficient to maintain the heel in molten state and to melt the salt flux and the free metal of the coated cloths. The eddy currents also cause fluid circulation within the melt, and especially in the molten metal heel. It is found that the introduced glass cloths undergo extensive disintegration in the induction furnace, becoming torn or broken up into small pieces or fragments, owing, as presently believed, to the described circulation of the molten metal heel in the furnace. The nonmetallic content of the used glass cloths, including the fragments of cloth as well as the oxides, nitrides, carbides and other nonmetallics carried by the cloth, become mixed with the molten flux in the furnace, while the free metal that coated the cloths coalesces with and augments the heel. Notwithstanding the circulation produced by the eddy currents, excellent separation is maintained within the furnace between the molten metal and the mixture of flux and nonmetallics. At the completion of the operation, the flux and nonmetallics are removed from the furnace, and the collected metal may be withdrawn from the furnace in any suitable manner for casting into ingots or other use.

The flux employed should be a mixture of salts selected to have a melting point below the operating temperature of the furnace, and a density at least somewhat different from molten aluminum. Also, the flux should not be highly volatile at temperatures below about 800° C. By way of specific illustration, it is found that salt mixtures comprising about 50% to about 80% sodium chloride and about 20% to about 50% potassium chloride (all percentages herein being by weight) are suitable for use as the flux in the method of the invention. These may be essentially binary salt mixtures; however, it is sometimes desirable to include in the flux a minor proportion (up to about 5%) of a fluoride such as sodium fluoride, cryolite or calcium fluoride to promote wetting and attack of the oxides present. The flux, as already indicated, becomes mixed with the glass cloth fragments and other nonmetallics of the used cloths, and the mixture of flux and nonmetallics separates from the molten metal in the furnace as a discrete, readily removable layer at the end of the operation. Unless flux is used in an amount at least about equal to the weight of nonmetallics in the glass cloth, hard deposits (apparently comprising oxides, glass cloth residues, and flux), tend to form on the bottom and walls of the furnace vessel, impeding operation.

Further it is preferred for the treatment of aluminum-coated glass cloth that the temperature of operation of the furnace be in a range of about 750° C. to about 800° C. for the molten metal heel. Lower temperatures tend to retard the rate of dissolution and increase the viscosity of the flux, while temperatures above the stated range result in unnecessarily high degrees of volatilization of the flux. It is also preferred that the alternating current supplied to the furnace coil be a relatively low frequency current, one exemplary value of such current being 180 Hz. Increase in frequency of the supplied current decreases the depth of penetration of the field created by the current.

With the described procedure, recoveries of aluminum metal substantially greater than 80% of the weight of the coated glass cloths introduced to the furnace are readily and easily obtained.

Further features and advantages of the invention will be apparent from the detailed description hereinbelow set forth, together with the accompanying drawings.

BRIEF DESCRIPTION OF THE DRAWING

The single figure is a schematic elevational sectional view of a coreless induction furnace in which the method of the present invention may be performed.

DETAILED DESCRIPTION

The method of the invention may be described as applied to the treatment of glass cloth screens used for filtering molten aluminum (i.e. pure metal or aluminum-base alloys) incident to casting or other operations. Such screens, when removed from their operative position after use, are substantially coated with solidified aluminum metal, together with nonmetallic materials such as oxides, nitrides and carbides. The free metal content of the used, coated glass cloth screens is ordinarily more than 80% of the total weight of the screen.

In accordance with the invention, for recovering free metal from aluminum-coated glass cloth, the cloth is introduced to a molten aluminum heel in an induction furnace in the presence of a salt flux while the heel is heated and circulated by electrical induction. The salt flux may be a mixture of chlorides comprising about 50% to about 80% sodium chloride and about 20% to about 50% potassium chloride, to which there may be added up to about 5% of a fluoride such as sodium fluoride, cryolite, or calcium fluoride. A specific example of a salt flux composition suitable for the practice of the invention is a salt mixture containing 45% potassium chloride, 50% sodium chloride and 5% sodium fluoride. The salt may be introduced to the induction furnace in solid particulate state, and is melted by the heat of the heel in the furnace. The amount of flux present in molten state in the furnace should at all times be at least about equal in weight to the amount of nonmetallic material; (including glass fiber) present in the glass cloth in the furnace. Preferably, the ratio of molten flux to nonmetallics of the glass cloth should be greater than 1 to 1, a ratio of 1.7 to 1 or higher being presently preferred.

One suitable known form of induction furnace in which the present method may be performed is the coreless induction furnace illustrated schematically in the figure. This furnace comprises an axially vertical cylindrical refractory crucible 10 surrounded concentrically by a conductive coil 12 formed for example of copper tube. As alternating current is passed through the coil 12 from a suitable source (not shown), a coolant such as water may be circulated through the coil to cool it. The charge of material to be heated in the furnace is placed within the crucible.

As will be understood, an induction furnace of the type described, having a charge of molten metal in the crucible, may be regarded as an electrical transformer with the power coil being the primary and the charge in the crucible the secondary of the transformer. When an alternating current supply is connected to the power coil, the current generates an alternating magnetic flux which cuts through the cylindrical mass of metal constituting the charge and in turn generates eddy currents in that mass. The charge is heated by resistance heating effects resulting from these eddy currents, such heating being independent of the magnetic nature of the charge but dependent on the resistivity of the charge. Also, the power (heat) output of the furnace increases with increase in the size of the charge present in the crucible.

The charge contained in the crucible in the practice of the present method includes molten aluminum metal, nonmetallic components of the introduced glass cloth, and molten salt flux. Essentially it is the resistance of the molten metal to the generated eddy currents that heats the charge. The eddy currents generated in the mass of metal are roughly concentric to the principal (vertical) axis of the crucible and give rise to their own alternating flux. The presence of this eddy current magnetic flux in addition to that generated by the alternating current passed through the power coil produces an effect similar to that of opposing two like poles of permanent magnets: there is created a mechanical repulsion force having its greatest intensity at the center of the opposing fields. The unevenly distributed force applied on the molten metal column (i.e. the charge) within the crucible exerts a pinching effect of the molten metal column, and the combination of this pinching effect with gravity produces in the charge the pattern of fluid circulation indicated by the arrows 14 in the figure.

Preferably, and especially for operations on a substantial scale in a furnace of the type illustrated, a relatively low frequency alternating current is supplied to the power coil 12. The depth of penetration of the coil field into the charge within the crucible (and hence, in a practical sense, the dimensions and capacity of a furnace of the illustrated type) is an inverse function of the current frequency. Also, the fluid circulation of the charge produced by the eddy currents increases with decreasing frequency of the supplied alternating current. Currents of 60 to 180 Hz. have been found satisfactory for the present method.

In performing the present method with the illustrated furnace, a heel of molten aluminum (preferably, an amount of molten aluminum equal to at least about 20% of the furnace capacity) is established within the crucible together with a small amount of salt flux for protecting the heel of metal from oxidation. Supply of alternating current to the power coil 12 produces eddy currents that generate heat in the heel. As will be understood, one purpose of the heel is to enable initial generation of the heat in the furnace, and to this end the heel should be sufficiently large (in relation to the capacity of the furnace) to enable attainment of a significant portion of the full power (heat) output of the furnace.

After the furnace has been thus placed in operation, and during continuing passage of alternating current through the power coil, a substantial proportion of the flux to be used is added to the charge in the crucible. The flux, which is a dry, particulate mixture of salts, is added slowly enough to avoid any significant reduction in temperature of the charge. The heat generated in the heel by induction melts the flux as it is added. Because the flux is poorly conductive to electricity and has a density (in the case of the illustrative flux composition described above) slightly less than that of aluminum, the molten flux assumes a hollow cylindrical shape within the crucible, surrounding the molten metal heel and in effect isolating the metal portion of the charge from the crucible wall. The metal portion of the charge is indicated at 16 in the figure and the surrounding layer of molten salt flux is indicated at 17.

Subsequent to the steps described, the used (i.e. aluminum-coated) glass cloth filter screens to be treated are added successively to the furnace melt, while the furnace temperature (i.e. the temperature of the heel) is kept preferably in a range between about 750° C. and about 800° C. The glass cloth is broken up, by the action of the circulating fluid currents in the metal heel (as presently believed), and the metal coating of the glass cloth coalesces with and augments the metal of the heel, while the disintegrated glass cloth itself, together with other nonmetallic materials carried in the filter screens, become absorbed in and/or mixed with the molten flux. The process may be continued, with further introduction of glass cloths and additions of salt flux as necessary, until the capacity of the furnace is reached, or until all the glass cloths to be treated have been consumed in the furnace.

Upon completion of this succession of steps, the furnace may be shut off. The molten metal and the flux containing glass cloth residue and other nonmetallics will separate clearly into discrete layers within the crucible, little if any metal being entrained in the mixture of flux and nonmetallics. The flux and nonmetallics are removed from the furnace by any appropriate procedure; and the molten metal thus separated form the glass cloth may be readily removed from the furnace, as for casting into ingots or other use, by siphoning, tapping, decanting or any other convenient procedure. It is presently preferred that the molten flux and nonmetallics be removed first from the furnace, i.e. prior to removal of the molten metal; in any event, the flux and nonmetallics are removed at the conclusion of the furnace cycle of operation. Sufficient metal is left in the furnace to constitute the heel for the next cycle of operation. The heel may typically be substantially greater in weight than the weight of glass cloth to be treated in a given cycle of operation.

It is, as stated, presently believed that the breaking up or disintegration of glass cloth that contributes to the convenience and effectiveness of the persent method is primarily attributable to the circulating molten metal currents in the heel produced by electrical induction. However, presence of the flux in the stated proportion is also necessary for a successful practice of the method. Unless sufficient flux is present, hard deposits form on the walls of the furnace crucible, and these are very difficult to remove. Furthermore, in the absence of sufficient flux, at least some part of the glass cloth residue remains on the molten metal surface in the furnace and retains some of the metal when removed. Finally, the flux may also contribute to the disintegration of the glass cloth.

For any particular coreless induction furnace used in the method of the present invention, the ratio of salt and nonmetallic glass cloth components to free metal in the furnace charge should be maintained below an upper limiting value determined by such factors as the design of the specific furnace and readily ascertainable by the operator. In this connection it may be explained that for any given quantity of molten aluminum in an induction furnace, increase in the quantity of molten flux and nonmetallics present in the charge increases the thickness of the cylindrical layer 17 of salt nonmetallics in the crucible, and hence increases the distance between the molten metal column and the furnace wall. When this distance approaches the depth of penetration of the magnetic field of the coil 12 (a factor dependent on the frequency of the alternating current passed through the coil), the power input to the induction furnace is greatly reduced, with resultant decrease in both heating effect and fluid circulation of the charge. As stated, the practical limiting value of the salt and nonmetallics to metal ratio for any particular furnace can readily be ascertained by observation.

An especially important advantage of the invention, especially as practice in a coreless induction furnace (e.g. of the type shown in the drawing, having an axially vertical arrangement of coil and crucible) is that there is little if any volatilization of salts from the flux at least at ordinary operating temperatures (below about 825° C.).

As stated above, the ordinarily preferred practice of the invention contemplates use of low frequency current (e.g. 60 to 180 Hz.) and provision of a substantial heel in the furnace. The present method may be advantageously combined with a method for treatment of aluminum-containing dross disclosed in the copending U.S. patent application of Melvin Elliott McLeod, John Edward Deutchman, Herbert Warrent Percival and Han Spoel (applicant herein) entitled Recovery of Metal From Dross, Ser. No. 105,025, filed Jan. 8, 1971, now U.S. Pat. No. 3,676,105 concurrently with this application and assigned to the same assignee as the present application. The method described in the application just mentioned contemplates the treatment of dross skimmed from a molten aluminum surface for recovery of free metal in the dross, including (in some described embodiments) the step of adding the dross to a molten aluminum heel in an induction furnace in the presence of a salt flux. Metal from the dross augments the heel while nonmetallics of the dross become mixed with the flux. By way of illustration, when the just-mentioned dross treatment method is performed in a furnace of the type described above, after the furnace has become partially filled, used (aluminum coated) glass cloths (instead of additional dross) and further salt flux as necessary may be added to the heel in the furnace for performance of the persent method.

By way of further illustration of the method of the invention, reference may be had to the following specific example of operation:

The procedures of this example are performed in a coreless induction furnace having an axially vertical refractory crucible 28 inches in diameter and about 51 inches deep, surrounded in its central portion by a water-cooled power coil made of hollow copper conductor, the coil being disposed in concentric relation to the crucible and extending for 31 inches along the axis of the crucible at a locality spaced from both the top and the bottom of the crucible. The described furnace is designed to operate on a frequency of 180 Hz. with a rated power output of 375 kilowatts and a capacity of one ton of aluminum metal.

In a furnace of this type, as already stated, it is found that the depth of penetration of the coil field into the charge varies inversely with the frequency of the alternating current through the coil. At 10 kHz., the depth of penetration of the field is about ¼ inch, while at 180 Hz. the depth of field penetration is three inches and increases to eight inches at 60 Hz. Similarly, the fluid circulation effect in the charge increases with decreasing frequency of the current through the coil, approximately doubling as the current frequency decreases from 180 Hz. to 60 Hz. For the described furnace dimensions and capacity, the depth of penetration and circulation effect provided by a 180 Hz. current through the coil is sufficient to afford satisfactory operation.

In the described furnace, containing a molten aluminum heel, 329 pounds of used, aluminum-coated glass cloth screen, were introduced to the heel in the furnace together with 90 pounds of a flux comprising about 47.5% sodium chloride, 47.5% calcium chloride, and 5% sodium fluoride. The furnace temperature before addition of flux was 850° C., and during the operation dropped to about 700° C. The glass cloth screens were completely absorbed in a period of between about 30 and about 40 minutes. Two hundred seventy six pounds of metal were recovered, equal to about 84% of the weight of glass cloth screens introduced to the furnace. The ratio of flux to nonmetallics (i.e. glass cloth fibers and other nonmetallics in the screens) in this operation was about 1.70 to 1 by weight.

Thereafter, 17 batches of used aluminum-coated glass cloth screens were treated by the method of the invention in the same furnace. The total weight of screens introduced to the furnace was 8,902 pounds. The weight of metal recovered was 7,882 pounds, or 88% of the weight of screens processed. The weight of flux used was 2,214 pounds, or about 2.2 pounds per pound of nonmetallics in the glass cloth screens. The particular flux to nonmetallics ratio employed varied quite widely from batch to batch, but satisfactory operation was found to be achieved so long as the ratio of flux to nonmetallics was at least about one part of salt to one part of nonmetallics in the glass cloth screens added.

It is to be understood that the invention is not limited to the features and embodiments hereinabove specifically set forth but may be carried out in other ways without departure from its spirit.

I claim:

1. A method of recovering aluminum metal from glass cloth at least partially coated therewith, comprising
   (a) establishing a heel of molten aluminum in an induction furnace and
   (b) continuously heating and causing fluid circulation within said heel in said furnace by electrical induction while
   (c) supplying to said heel in said furnace a quantity of a salt flux that melts on contact with the heated heel to provide in said furnace a quantity of molten flux in contact with but separate from the molten aluminum therein, and while
   (d) introducing the aluminum-coated glass cloth to the furnace for heating and mixture with said heel, and effecting disintegration of said cloth by fluid circulation within said heel as aforesaid, the fluid circulation bringing the cloth into contact with the quantity of molten flux, aluminum metal from the cloth coalescing with said heel, and nonmetallic material of the cloth becoming mixed with said flux in said furnace.

2. A method according to claim 1, wherein the quantity of flux supplied to said heel in said furnace is at least about equal in weight to the amount of nonmetallic material present in the aluminum-coated glass cloth introduced to said furnace.

3. A method according to claim 2, wherein the heel, flux and coated glass cloth are heated in said furnace to a temperature between about 750° C. and about 800° C.

4. A method according to claim 2, wherein said flux comprises a mixture of sodium chloride and potassium chloride containing between about 50% and about 80% sodium chloride by weight, and between about 20% and about 50% potassium chloride by weight.

5. A method according to claim 4, wherein said flux further includes a minor proportion of a fluoride.

6. A method according to claim 2, wherein the ratio of supplied flux to nonmetallic material in the coated glass cloth is at least about 1.7 to 1 by weight.

7. A method of recovering metal from glass cloth at least partially coated therewith, comprising
   (a) introducing the coated glass cloth to a molten heel of the metal in an induction furnace and
   (b) supplying to the heel in the furnace a quantity of a salt flux that melts upon contact with the heel to provide in said furnace a quantity of molten flux in contact with but separate from the molten aluminum therein while
   (c) continuously heating the heel in the furnace by electrical induction, and causing fluid circulation within said heel by electrical induction for effecting disintegration of said cloth, the fluid circulation bringing the cloth into contact with the quantity of molten flux, metal from the cloth coalescing with said heel and nonmetallic material of the cloth becoming mixed with said flux in said furnace.

8. A method of recovering aluminum metal from glass cloth at least partially coated therewith, comprising
  (a) continuously heating, and causing fluid circulation within, a heel of molten aluminum in an induction furnace, by electrical induction, while
  (b) first supplying to said heel in said furnace a quantity of a salt flux that melts by contact with the heated heel to provide in said furnace a quantity of molten flux in contact with but separate from the molten aluminum therein, and
  (c) subsequently introducing a quantity of the aluminum-coated glass cloth to the furnace for heating in and mixture with said heel, and effecting disintegration of said cloth by fluid circulation with said heel as aforesaid, the fluid circulation bringing the cloth into contact with the quantity of molten flux, aluminum metal from the cloth coalescing with said heel, and nonmetallic material of the cloth becoming mixed with said flux in said furnace.

9. A method according to claim 8, wherein the quantity of molten flux established in said furnace prior to introduction of the aluminum-coated glass cloth is at least about equal in weight to the amount of nonmetallic material present in said quantity of aluminum-coated glass cloth subsequently introduced to said furnace.

10. A method according to claim 9, further including the steps of introducing additional quantities of aluminum-coated glass cloth to said furnace subsequent to introduction of said first-mentioned quantity of glass cloth, and supplying additional quantities of said salt flux to said heel as necessary to maintain a weight of molten flux in said furnace at least about equal to the weight of nonmetallic material in the glass cloth in said furnace as said additional quantities of glass cloth are introduced thereto.

References Cited
UNITED STATES PATENTS

| | | | |
|---|---|---|---|
| 1,950,967 | 3/1934 | Bonsack | 75—68 R |
| 2,946,834 | 7/1960 | Junker | 75—10 R X |
| 1,180,435 | 4/1916 | Robison | 75—65 R X |
| 1,550,192 | 8/1925 | Wild et al. | 75—68 R |
| 2,170,863 | 8/1939 | Junker et al. | 75—65 R |
| 3,085,124 | 4/1963 | Upton | 75—65 R X |
| 3,484,089 | 12/1969 | Foster | 75—65 R X |
| 3,536,478 | 10/1970 | Ankerson | 75—68 R X |
| 1,921,868 | 8/1933 | Evans | 75—65 R X |
| 2,375,049 | 5/1945 | Tama et al. | 75—10 R X |
| 3,495,019 | 2/1970 | Santi | 75—68 R X |
| 3,650,730 | 3/1972 | Derham | 75—68 R |
| 3,676,105 | 7/1972 | McLeod et al. | 75—10 R X |

OTHER REFERENCES

Tama; article in The Iron Age; Sept. 4, 1947; pp. 76–79.
Carl et al.; article in Modern Metals; April 1947; pp. 18–23.

L. DEWAYNE RUTLEDGE, Primary Examiner

M. J. ANDREWS, Assistant Examner

U.S. Cl. X.R.
75—65 R, 68 R

UNITED STATES PATENT OFFICE
CERTIFICATE OF CORRECTION

PATENT NO. : 3,752,662
DATED : August 14, 1973
INVENTOR(S) : Han Spoel

It is certified that error appears in the above-identified patent and that said Letters Patent are hereby corrected as shown below:

On the title page of the patent (i.e., the page containing the drawing), "H. S. St. Cesaire" should read --Han Spoel-- .

Signed and Sealed this eleventh Day of May 1976

[SEAL]

Attest:

RUTH C. MASON
Attesting Officer

C. MARSHALL DANN
Commissioner of Patents and Trademarks